United States Patent
Devey et al.

(10) Patent No.: US 10,445,272 B2
(45) Date of Patent: Oct. 15, 2019

(54) NETWORK FUNCTION VIRTUALIZATION ARCHITECTURE WITH DEVICE ISOLATION

(71) Applicant: Intel Corporation, Santa Clara, CA (US)

(72) Inventors: Kevin Devey, Santa Clara, CA (US); John Browne, Santa Clara, CA (US); Chris Macnamara, Santa Clara, CA (US); Eoin Walsh, Santa Clara, CA (US); Bruce Richardson, Chicago, IL (US); Andrew Cunningham, Santa Clara, CA (US); Niall Power, Santa Clara, CA (US); David Hunt, Santa Clara, CA (US); Changzheng Wei, Santa Clara, CA (US); Eliezer Tamir, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/027,776

(22) Filed: Jul. 5, 2018

(65) Prior Publication Data
US 2019/0042506 A1  Feb. 7, 2019

(51) Int. Cl.
*G06F 13/38*   (2006.01)
*G06F 1/3203*  (2019.01)
*G06F 9/455*   (2018.01)
*G06F 9/4401*  (2018.01)

(52) U.S. Cl.
CPC .......... *G06F 13/385* (2013.01); *G06F 1/3203* (2013.01); *G06F 9/45558* (2013.01); *G06F 9/4411* (2013.01); *G06F 2009/45587* (2013.01); *G06F 2009/45595* (2013.01); *G06F 2213/0026* (2013.01)

(58) Field of Classification Search
CPC ... G06F 13/385; G06F 1/3203; G06F 9/45558
USPC .......................................................... 710/1
See application file for complete search history.

(56) References Cited

U.S. PATENT DOCUMENTS

| | | | | |
|---|---|---|---|---|
| 9,185,093 | B2* | 11/2015 | Gupta | H04L 63/08 |
| 2006/0026683 | A1* | 2/2006 | Lim | H04L 63/1416 |
| | | | | 726/23 |
| 2010/0169507 | A1* | 7/2010 | Sahita | G06F 9/45558 |
| | | | | 709/250 |

(Continued)

*Primary Examiner* — Paul R. Myers
(74) *Attorney, Agent, or Firm* — Bell & Manning, LLC (57) ABSTRACT

A network system includes a central processing unit and a peripheral device in electrical communication with the central processing unit. The peripheral device has at least one power input and a data input. The network system also includes an out of band controller in electrical communication with the central processing unit, the peripheral device, and an external management interface. Responsive to an identified threat, the out of band controller is configured to disable the at least one power input and the data input to the peripheral device, where the disablement indicates to the central processing unit that a hot plug event has occurred with respect to the peripheral device. The out of band controller is also configured to enable auxiliary power to the peripheral device such that the out of band controller remains in communication with the peripheral device during remediation of the identified threat.

24 Claims, 5 Drawing Sheets

(56) References Cited

U.S. PATENT DOCUMENTS

| | | | | |
|---|---|---|---|---|
| 2010/0321395 A1* | 12/2010 | Maciesowicz | ............ | G06F 3/14 345/502 |
| 2011/0004680 A1* | 1/2011 | Ryman | ................ | H04L 67/025 709/224 |
| 2011/0040922 A1* | 2/2011 | Dearman | ............ | G06F 11/2733 710/316 |
| 2012/0079566 A1* | 3/2012 | Barranco | ................ | H04L 63/18 726/4 |
| 2012/0297057 A1* | 11/2012 | Ghosh | .................. | G06F 21/575 709/224 |
| 2012/0304244 A1* | 11/2012 | Xie | ........................ | G06F 21/00 726/1 |
| 2014/0165183 A1* | 6/2014 | Dharmadhikari | ... | H04L 63/0227 726/13 |
| 2015/0033222 A1* | 1/2015 | Hussain | .............. | G06F 9/45533 718/1 |
| 2017/0250953 A1* | 8/2017 | Jain | ..................... | H04L 63/0254 |
| 2018/0375897 A1* | 12/2018 | Kawasaki | ............ | H04L 63/1491 |

\* cited by examiner

NETWORK FUNCTION VIRTUALIZATION ARCHITECTURE WITH DEVICE ISOLATION

BACKGROUND

Network function virtualization (NFV) refers to architectures that use information technology virtualization to virtualize classes of network node functions into building blocks. The building blocks are used to generate virtualized network functions for the provision of communication and other network services. In some implementations, the virtualized network functions are formed of virtual machines that run different types of software and processes on top of servers, switches, storage devices, etc. NFV architectures utilize these virtualized network functions to replace some of the custom hardware components found in traditional network systems.

BRIEF DESCRIPTION OF THE DRAWINGS

Illustrative embodiments of the invention will hereafter be described with reference to the accompanying drawings, wherein like numerals denote like elements.

DETAILED DESCRIPTION

In traditional network architectures, including network function virtualization (NFV) architectures, when a system is suspected of being compromised or known to be compromised by a malicious entity, the system is typically isolated for remediation, shut down entirely, and/or re-formatted. This is a difficult process because part of the resulting network transformation involves moving workloads closer to the customer (e.g., to a Central Office (CO) or a Next Generation Central Office (NGCO)). Additionally, deployment of service technicians is often required for physical intervention with system components, which can be time consuming and costly. There is also typically a limited number of hardware resources available in network architectures. As a result, shutting down a server (or other important resource) and removing that resource from the pool causes network performance and/or access issues.

Described herein is a network architecture that utilizes device isolation to improve resilience and security of the network in the event of a malicious attack. The proposed methods and systems allow the network system to maintain a good level of performance for the customer, while also actively responding to a threat by cutting off the attacker. The proposed systems and methods also enable protection of unmanned NFV network deployments such as virtual customer premises equipment (CPE) systems in the event of Day 0 and other vulnerabilities.

The systems and methods described herein provide a powerful threat response tool by giving control of all PCIe connected devices (NICs, storage, etc.) and other connected devices to an out of band device such as a Baseboard Management Controller which implements an SMBus (or other) controller. As used herein, out of band refers to use of a data/communication channel that is independent from a main in band data/communication channel used by the system. The out of band device is much more difficult to access, as compared to a standard NFV platform where customer code is running. The proposed systems and methods can be used to respond to a number of different types of attacks, including a Day 0 access escalation attack. The Day 0 access escalation attack allows a user to escape a guest virtual machine (VM) and access a hypervisor of the system, which is one of the largest threats faced by any provider of virtualized services, such as communications service providers.

In one embodiment, to protect against a malicious attacker, a suspected system is disconnected from the internet (or other communication network) to stop the attacker from accessing the system. If the system is compromised, then access to any data on the system is possible and it is a definite threat that could result in severe consequences. In another embodiment, access and storage components of the network system are securely isolated from a remote location in order to prevent malicious entities from continuing their attack on the system. The component isolation also reduces or eliminates the service outage for the end customer and prevents access to customer data on the compromised system. As discussed in more detail below, the device isolation is performed independent of the central processing unit (CPU) and any accessible resources of the network system as they can no longer be trusted.

More specifically, described herein are systems and methods to move power state control of storage, networking, field-programmable gate array (FPGA), and other peripheral devices (e.g., peripheral component interconnect express (PCIe) devices) from an operating system (OS) to an out of band device in the event of an attack. An FPGA refers to an integrated circuit designed to be configured by a customer/designer after the manufacturing process. A PCIe device refers to a high-speed serial computer expansion bus standard that allows a computing system to interface with various peripheral devices. The proposed methods and systems allow system operators to block attacks on platforms (e.g., a central office (CO)) without interrupting customer workloads. The proposed methods and systems allow PCIe devices to be controlled through much more secure out of band methods such that even if an attacker breaks into a platform they are unable to remove any data from the platform. The proposed methods and systems also allow operators to force PCIe devices offline in the event of thermal or power issues when the devices are operating in a power or thermally constrained environment. Additionally, incorporation of a power management integrated circuit (PMIC) and buffer onto a PCIe card of a device allows for differentiation across a number of different systems and components such as network interface controllers (NICs), solid state drives (SSDs), etc.

Figure 1:
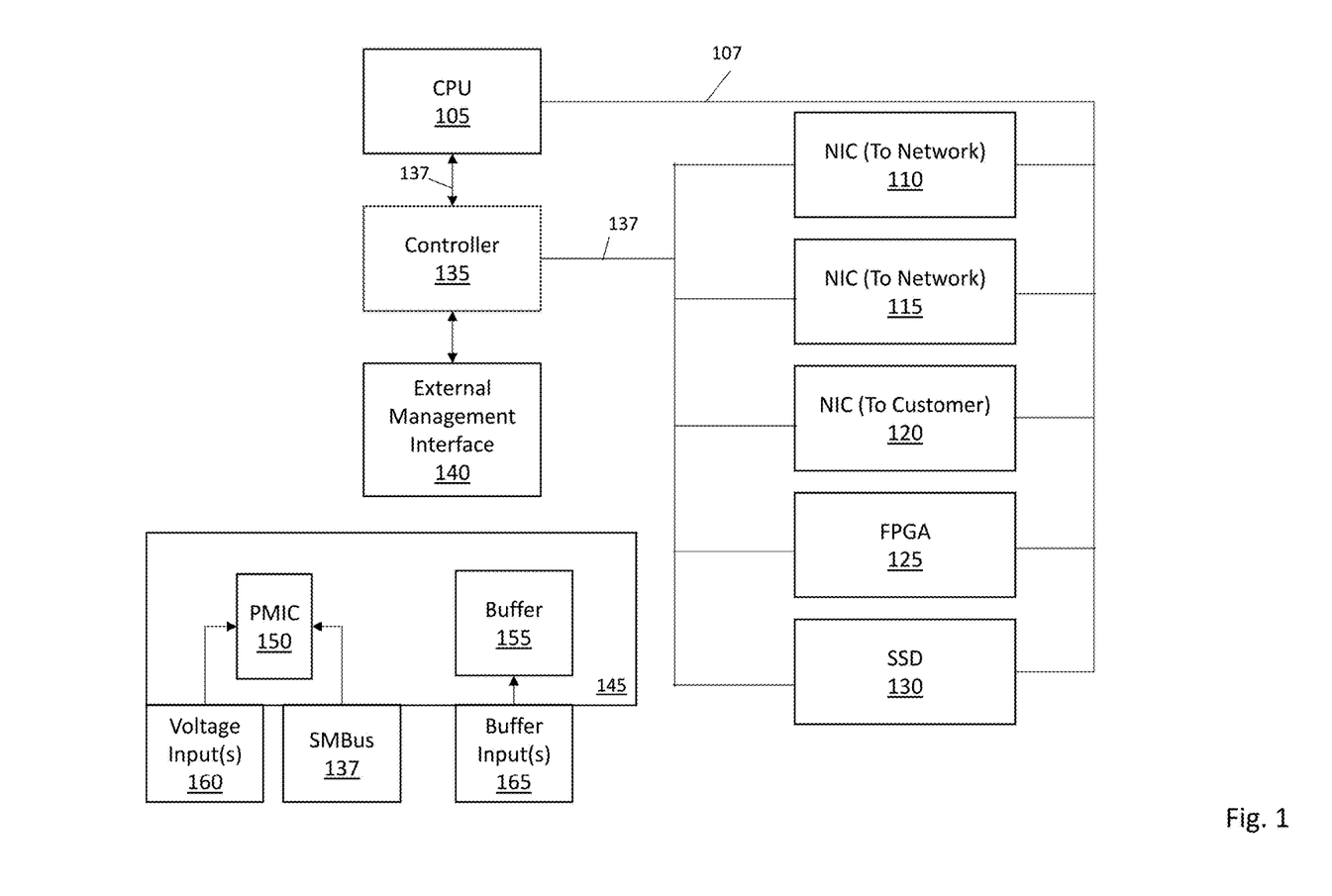
FIG. 1 is a block diagram of a network system in accordance with an illustrative embodiment.

FIG. 1 is a block diagram of a network system in accordance with an illustrative embodiment. The network system includes a central processing unit (CPU) 105 that is in electrical communication with a plurality of PCIe devices through a PCIe bus 107. As used herein, electrical communication can refer to any wired or wireless connection between components that enables unidirectional or bidirectional exchange of information between the components. In alternative embodiments, the CPU 105 can communicate with peripheral components by way of a fabric, mesh interconnect, etc. The CPU 105 can be any type of computer processor and/or computer controller known in the art. In alternative embodiments, the network system may include multiple CPUs.

The PCIe devices include a first network interface controller (NIC) 110 to enable a network connection, a second NIC 115 to enable a network connection, a third NIC 120 to enable a customer connection, a FPGA 125, and an SSD 130. A NIC refers to any hardware/software component that is used to connect a computing system to a network using specified physical layer and data link layer standards. The network connections can be internet connections, local area network (LAN) connections, cellular network connections, etc. These PCIe devices can be any type(s) of NICs, FPGAs, and SSDs known in the art. In alternative embodiments, the network system can include fewer, additional, and/or different PCIe devices. In another alternative embodiment, the network system can include other types of peripheral devices in addition to (or alternative to) the PCIe devices such as serial advanced technology attachment (SATA) devices, etc. The CPU 105 is configured to control the PCIe devices and/or other devices during normal operation of the network system.

A controller 135 is in electrical communication with both the CPU 105 and the PCIe devices by way of a system management bus (SMbus) 137. The controller 135 is an out of band controller that is not accessible to unauthorized entities such as an attacker of the network system. In another illustrative embodiment, the controller 135 is a microcontroller that, in the event of an attack, becomes a master controller for the network system and causes the CPU 105 to become a slave controller. In alternative embodiments, the controller 135 can be any type computer processor or controller known in the art. Although a single SMbus 137 is depicted in the network system of FIG. 1, the network system can include multiple SMbuses in alternative embodiments.

The controller 135 is in electrical communication with an external management interface 140. The external management interface 140 enables a remote technician (or remote software) to access and control the controller 135 through a secure connection that cannot be accessed by an attacker. The external management interface 140 can allow a fully or partially dedicated remote operator computing device such as a laptop computer, desktop computer, tablet, smart phone, etc. to access the controller 135. The external management interface 140 also includes an application or software stored on a remote computing device. In an illustrative embodiment, the external management interface 140 is accessed and controlled by a human operator in the event of an attack or possible attack. In an alternative embodiment, the external management interface 140 may be controlled by software that is designed to respond to the attack or potential attack.

In an illustrative embodiment, the network system utilizes a mutual authentication/key exchange between the controller 135 and the external management interface 140 (or a computing device associated with the external management interface 140). The mutual authentication/key exchange is carried out when the controller 135 and external management interface 140 are added to the network system, and is used to prevent the controller 135 and/or external management interface 140 from being used maliciously. As a result of the authentication, only authenticated management systems can be used to access, control, and/or disconnect the PCIe devices.

The network system of FIG. 1 also includes a PCIe card 145. Although a single PCIe card 145 is depicted, each of the PCIe devices can include a distinct PCIe card that is configured to include the functionality described with reference to the example PCIe card 145. The PCIe card 145, which can be any type of PCIe card known in the art, includes a power management integrated circuit (PMIC) 150 and a buffer 155. In other embodiments, the PCIe card 145 can include fewer, additional, and/or different components. The PMIC 150 receives one or more voltage inputs 160 such as a 12 Volt (V) input, a 3.3 V (3V3) input, a 3V3 auxiliary rail (3V3A) input, a ground input, etc. The PMIC 150 is also connected to the SMBus 137. The buffer 155 of the PCIe card 145 receives one or more buffer inputs 165 such as data, a clock (CLK) signal, etc. In an alternative embodiment, the PMIC and/or buffer can be included on the baseboard between the PCIe card(s) and the CPU/power supply.

Incorporation of the PMIC 150 and the buffer 155 into the system makes it possible to emulate a PCIe hot plug event in the network system. As discussed above, the PMIC 150 and the buffer 155 can be placed on the PCIe card 145 or at any location between the PCIe card 145 and the CPU 105 and power supply of the network system. To emulate a PCIe hot plug event, data to the PCIe device is removed using the buffer 155, the normal 12 V and 3V3 inputs to the PCIe device are removed by the PMIC, and a 3V3 auxiliary rail input to the PMIC is used to power the PCIe device until the normal power inputs can be used again. In an illustrative embodiment, the PMIC remains connected to all power rails during the emulated hot plug event, and the PMIC acts as a switch to control which power rails are passed through as inputs to the PCIe device. As discussed herein, this configuration and the ability to emulate PCIe hot plug events allows the network system to selectively disable PCIe devices and/or other devices through an out of band method using the (out of band) controller 135.

In operation, when a threat is detected in the network system, the external management interface 140 is used to connect to the controller 135. As discussed above, the external management interface 140 is wholly under the control of an operator or system software, and cannot be accessed by an outside user. To combat the threat, a disconnect command is provided to the controller 135 by way of the external management interface 140. The disconnect command can be with respect to any of the PCIe devices that are affected or that may be affected by the threat.

Upon initiation of a hot plug emulation event to disconnect a device, an alert is sent from the (out of band) controller 135 to the CPU 105 to inform the OS to prepare for a hot-plug event, and to allow adequate time for the OS to complete any routines involving the device. In one embodiment, a response or a time-out is used to continue the disconnection process, whichever one comes first. For example, the disconnection process can continue responsive to a response from the CPU that the OS has completed the routine. The controller 135 can also use a timer to track the amount of time that elapses after the alert is sent to the CPU 105. If the elapsed amount of time exceeds a threshold time value, the controller 135 proceeds with the disconnection process responsive to a timeout condition based on the threshold time value.

In another illustrative embodiment, the controller 135 is used to prevent the malicious entity in control of the CPU and/or operating system (OS) from simply turning disconnected devices back on via the SMBus 137. For example, the controller 135 can be an SMBus controller or can include an SMBus controller, and is configured to filter and block SMBus commands such that the only entity who can re-enable disconnected devices is the entity in control of the external management interface 140. In such an embodiment, the controller 135 is configured to allow modification of command whitelist in runtime.

In disaggregated architectures such as a rack scale architecture, one technical problem involves isolation of the attacker from the outside and the rest of the rack. In the rack scale case, both the networking and storage components on the fabric associated with the malicious entity are isolated within the rack and the outgoing associated interfaces are isolated, effectively creating a jail for the detected malicious agent. This approach prevents the attacker from impacting services upstream and downstream, and also protects critical infrastructure services co-located in the same rack scale box.

A secondary benefit of the proposed systems and methods occurs when the network system is in a healthy state (i.e., not under attack). The controller 135 can be used in conjunction with the CPU 105 such that the CPU 105 itself can control the state of the PCIe devices. This means that in the case of a rack consuming too much power, the operator can start recovering power by purposefully disconnecting PCIe devices to alleviate any power consumption issues, or to reduce heat production in event of a thermal issue. In a location such as a CO where power is limited, this technique can be used to power off peripheral devices (e.g., NICs, FPGAs, storage devices, etc.) connected to an out of band controller during peak bandwidth events. Methods for implementing power recovery and heat reduction are described with reference to FIG. 5.

Figure 2:
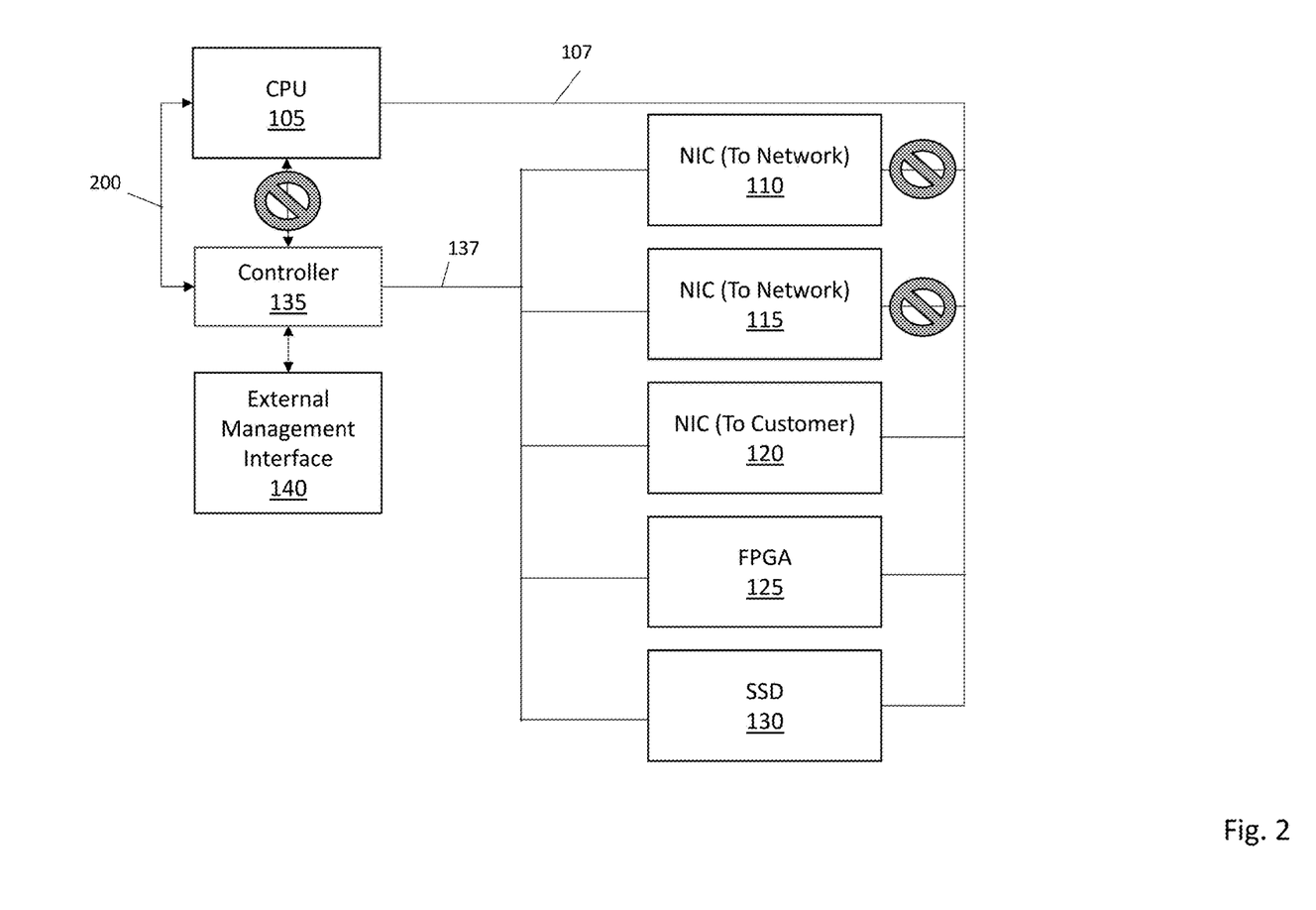
FIG. 2 is a block diagram depicting a response to an attack of the network system of FIG. 1 in accordance with an illustrative embodiment.

FIG. 2 is a block diagram depicting a response to an attack of the network system of FIG. 1 in accordance with an illustrative embodiment. The attack can be any type of unauthorized access to the network system, and can be identified using any techniques known in the art. Upon detection of the attack, a remote operator (or software) is notified of the identified threat. The remote operator accesses the controller 135 through the external management interface 140, and uses the external management interface 140 to authenticate with the controller 135 in order to obtain access thereto.

The remote operator and/or system software identifies one or more devices to disconnect from the network system in an effort to thwart the attack. In the embodiment of FIG. 2, the first NIC 110 and the second NIC 115, both of which enable network connections, have been identified as devices to be disconnected. In one embodiment, the controller 135 is used to send an alert message to the CPU 105 to inform the CPU 105 that the first NIC 110 and the second NIC 115 are going to be disconnected from the network system through hot plug events. Upon receipt of a response from the CPU 105 indicating that the hot plug events can proceed or as a result of a timeout as discussed above, the controller 135 commences emulation of the hot plug events. In an alternative embodiment, an alert message may not be sent to the CPU 105 from the controller 135.

As discussed above, the controller 135 controls one or more PMICs associated with the first NIC 110 and the second NIC 115 such that data inputs, 12 V inputs, 3V3 inputs, and any other normal power inputs are disabled to the first NIC 110 and the second NIC 115. The controller 135 also causes the one or more PMICs to provide a 3V3 auxiliary rail voltage signal to be used to power the first NIC 110 and the second NIC 115. As a result, it appears to the CPU 105 that hot plug events have occurred in which the NIC 110 and the NIC 115 have been removed from the network system. In reality, the first NIC 110 and the second NIC 115 are still physically connected to the network system, but they are no longer visible to the CPU 105. The connections between the CPU 105 and the first NIC 110 and the second NIC 115 are therefore disabled, as shown in FIG. 2. The disconnection prevents the first NIC 110 and the second NIC 115 from being able to access the network system or its data. In an alternative embodiment, instead of recognizing the disablement of the first NIC 110 and the second NIC 115 as hot plug events, the CPU 105 may recognize the disablements as catastrophic failures of those devices.

Once the connections between the CPU 105 and the first NIC 110 and second NIC 115 are disabled, the attacker is unable to use the first NIC 110 or the second NIC 115 to access or control the CPU 105, or to remove any data from the system. The remote operator then performs network system remediation by performing firmware updates on the affected PCIe devices and/or taking other actions such as verifying that the hypervisor of the network system has not been compromised.

As also depicted in FIG. 2, the third NIC 120 (associated with the customer), the FPGA 125, and the SSD 130 remain functional. The customer therefore still has access to the network system and its resources such that the customer is unaware of the attack and does not experience an interruption in service. In one embodiment, while the threat is being handled, the third NIC 120, the FPGA 125, and the SSD 130 can continue to be controlled by the CPU 105. In another embodiment, the third NIC 120, the FPGA 125, and the SSD 130 may be controlled by the controller 135 through the SMBus 137 until the network system is restored. In another embodiment, the PCIe components that remain functional can be controlled by the CPU 105, which can act as a slave to the controller 135 until the network system is restored. In alternative scenarios, one or more of the third NIC 120, the FPGA 125, and the SSD 130 may also be disconnected from the CPU 105, depending on the threat.

The embodiment of FIG. 2 shows a disconnect between the CPU 105 and the (out of band) controller 135. The disconnect can be one-way such that the controller 135 can transmit to the CPU 105, but the CPU 105 is unable to transmit messages/commands/data to the controller 135. The disconnect can also be bi-directional depending on the situation. In an alternative embodiment, communication between the CPU 105 and the controller 135 may not be blocked, and the controller 135 can be configured to monitor and analyze all messages/commands/data emanating from the CPU 105 onto the SMBus 137 to ensure that they are not malicious.

As shown in FIG. 2, a separate communication path 200 is included between the controller 135 and the CPU 105 for use in threat response scenarios. The separate communication path 200 can be implemented using any type of hardware or techniques known in the art. The separate communication path 200 allows the controller 135 to communicate with the CPU 105 while at the same time isolating the CPU 105 from the SMBus 137. As discussed in more detail below, the communications between the CPU 105 and the controller 135 during a threat allows the controller 135 to assess whether the CPU 105 and/or a hypervisor of the network system have been compromised. In alternative embodiments, the separate communication path 200 between the controller 135 and the CPU 105 may not be included.

Figure 3:
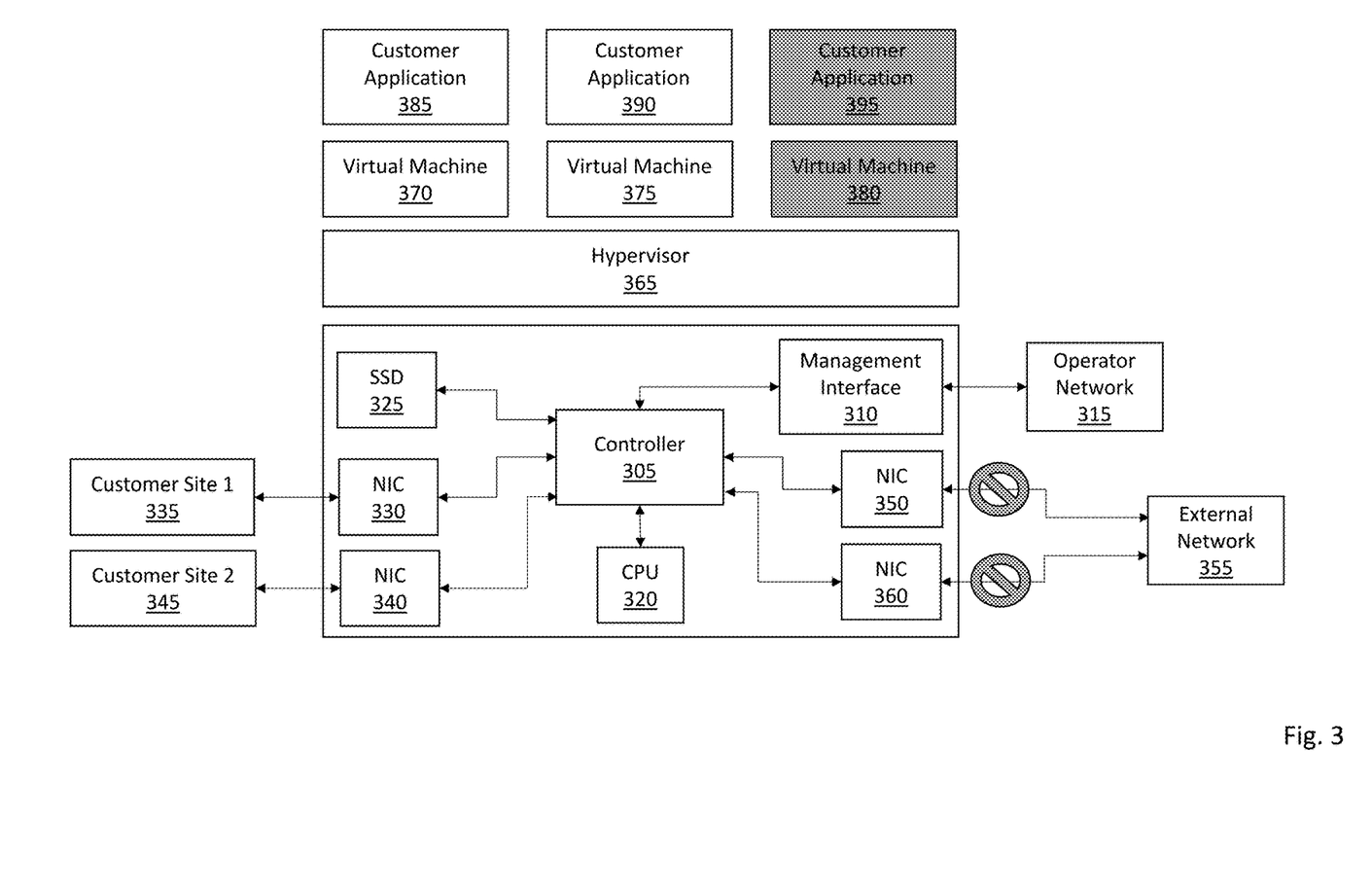
FIG. 3 is a block diagram depicting a threat response for a network system of a next generation central office (NGCO) in accordance with an illustrative embodiment.

FIG. 3 is a block diagram depicting a threat response for a network system of a next generation central office (NGCO) in accordance with an illustrative embodiment. The network system includes a controller 305, which is an out of band controller that can correspond to the controller 135 described with reference to FIGS. 1 and 2. The controller 305 can be an SMBus controller such that the controller 305 is able to communicate with PCIe devices through an SMBus. The controller 305 is in electrical communication with a management interface 310 that allows a remote operator to access and control the controller 305 through an operator network 315. The operator network 315 provides a secure connection to the network system that cannot be accessed by an attacker.

The controller 305 is also in electrical communication with a CPU 320 of the network system and a plurality of PCIe devices. The CPU 320 can be any type of computer processor/controller known in the art, and can be configured to operate and control the network system during normal operation. The PCIe devices include an SSD 325, a first NIC 330 to facilitate a connection between the network system and a first customer site 335, a second NIC 340 to facilitate a connection between the network system and a second customer site 345, a third NIC 350 to facilitate a first connection to an external network 355, and a fourth NIC 360 to facilitate a second connection to the external network 355. The external network 355 can be the internet or any other type of network which is at least partially accessible to the general public. In alternative embodiments, the network system can include fewer, additional, and/or different PCIe devices. The network system can also communicate with fewer or additional customer sites. In an illustrative embodiment, each of the PCIe devices has an associated PCIe card, such as the PCIe card 145 described with reference to FIG. 1, that includes at least a PMIC and a buffer. Alternatively, the PMIC and/or buffer can be included on the baseboard between the PCIe card and the CPU and power supply of the network system.

The network system also includes a hypervisor 365 which is configured to generate and control a virtual machine (VM) 370, a virtual machine 375, and a virtual machine 380. In alternative embodiments, fewer or additional virtual machines may be included. As also depicted in FIG. 3, the virtual machine 370 is running a customer application 385, the virtual machine 375 is running a customer application 390, and the virtual machine 380 is running a customer application 395. In the embodiment of FIG. 3, at least the customer application 385 and the customer application 390 do not involve the exchange of critical or sensitive data. In alternative embodiments, any of the customer applications may involve critical or sensitive data. Additionally, any of the virtual machines can run a plurality of customer applications in other embodiments.

In the embodiment of FIG. 3, the virtual machine 380 has been attacked and is therefore assumed to be in the control of a malicious entity. The attack on the virtual machine 380 can be identified using any techniques known in the art. By attacking the virtual machine 380, it is possible for the malicious entity to use that virtual machine to access and take over control of the hypervisor 365. For example, in a recent publicly disclosed day zero attack, an attacker was able to utilize privilege escalation to take control of a hypervisor through a virtual machine. Upon identification of the attack on the virtual machine 380, the network system therefore assumes that the hypervisor 365 may be compromised.

When the attack on the virtual machine 380 is first detected and the health of the hypervisor is unknown, an operator accesses the controller 305 through the operator network 315 and the management interface 310 to disable connections to the external network 355. As described herein, the controller 305 emulates hot plug events with respect to each of the third NIC 350 and the fourth NIC 360 to disable their connections to the external network 355. More specifically, the controller 305 is used to control one or more PMICs associated with the third NIC 350 and the fourth NIC 360 such that data inputs, 12 V inputs, 3V3 inputs, etc. are disabled to those devices. As a result, it appears to the CPU 320 that hot plug events have occurred in which the third NIC 350 and the fourth NIC 360 have been removed from the network system. In one embodiment, the controller 135 also causes the one or more PMICs to apply a 3V3 auxiliary rail voltage signal to power the third NIC 350 and the fourth NIC 360 such that the controller 305 is able to communicate with the NICs and perform remediation. As a result of the emulated hot plug events, the connections between the third NIC 350 and the fourth NIC 360 to the external network 355 are disabled, as depicted in FIG. 3.

Because the customer application 385 and the customer application 390 do not involve sensitive data exchange, these applications are allowed to continue running without interrupting the service to the customers. However, there may be connection issues if either of the customer application 385 or the customer application 390 utilizes outside connections via the external network 355 in order to function. In an embodiment in which the customer application 385 or the customer application 390 does involve sensitive data, those applications may be terminated to protect the sensitive data until the threat has been resolved.

In one embodiment, the controller 305 can perform network system remediation on the virtual machine 380 by way of the hypervisor 365. However, as discussed above, the health of the hypervisor 365 is unknown upon identification of the attack. In one embodiment, the controller 305 assesses the health of the hypervisor 365 and only proceeds with virtual machine remediation once it is determined that the hypervisor 365 has not been compromised. The controller 305 can utilize the CPU 320 to run a hash or other algorithm to verify the status of the hypervisor 365. Alternatively, the controller 305 may directly run the hash or other algorithm on the hypervisor 365 independent of the CPU 320. The controller 305 can also generate, or instruct the CPU 320 to generate, an attestation report with respect to the health of the hypervisor 365. The controller 305 and/or an operator in communication with the controller 305 can attempt to verify that the hash is correct and/or that the attestation report is indicative of a healthy hypervisor. If it is determined that the hypervisor 365 has been compromised or if it is not possible to confirm the health of the hypervisor 365, the controller 305 is used to disconnect all of the remaining PCIe devices (and any other connected devices), to tear down the system, and to rebuild the system. In the event of a system rebuild, remaining customer applications (e.g., the customer application 385 and the customer application 390) are spun up on another machine and the traffic re-routed via a top of rack (TOR) switch as known in the art such that service is not interrupted for those customers.

If the hypervisor 365 is determined to be healthy, remediation of the virtual machine is commenced. To perform remediation, the controller 305 is used to access the hypervisor 365 to tear down and rebuild the virtual machine 380 using any techniques known in the art. In an alternative embodiment, the network system can be designed such that the controller 305 is able to perform remediation of the virtual machine independent of the hypervisor 365.

Figure 4:
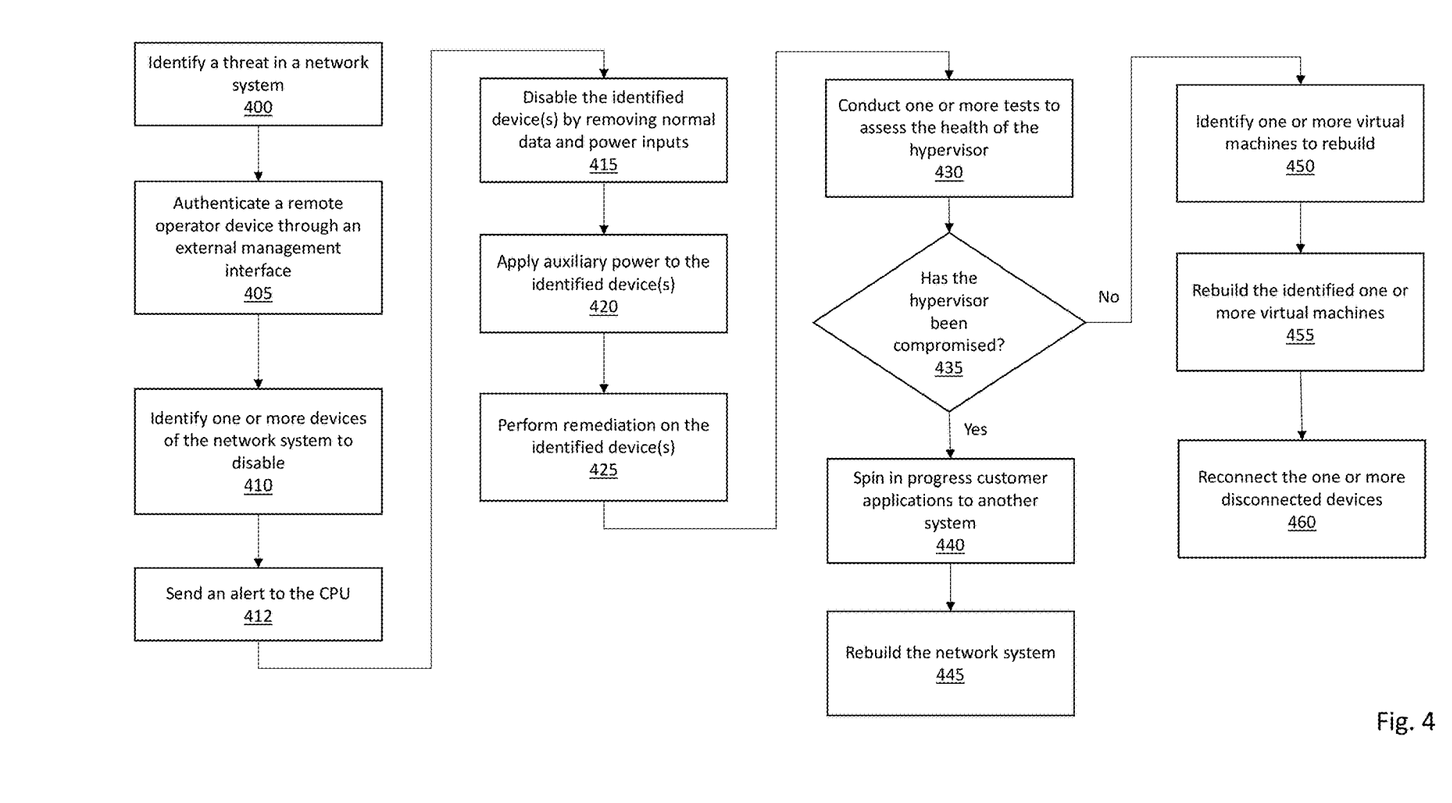
FIG. 4 is a flow diagram depicting operations performed by a network system in response to a threat in accordance with an illustrative embodiment.

FIG. 4 is a flow diagram depicting operations performed by a network system in response to a threat in accordance with an illustrative embodiment. In alternative embodiments, fewer, additional, and/or different operations may be performed. Additionally, the use of a flow diagram is not meant to be limiting with respect to the order of operations performed. The operations of FIG. 4 may be performed by an out of band controller (e.g., an SMBus controller), by a remote computing device under the control of an operator and able to securely access the out of band controller, by a PCIe card, and/or by a CPU of the network system.

In an operation 400, a threat in the network system is identified. The threat, which can be unauthorized access to network system, viral code uploaded to the network system, etc., is identified using any techniques known in the art. For example, the threat can be identified by anti-virus software, access control software, a local or remote operator, etc. In an operation 405, a remote operator device is authenticated through an external management interface of the network system. The remote operator can be an authorized technician and the remote operator device is any type of network accessible computing device. The authentication is a mutual authentication in the form of a key exchange in one embodiment. Alternatively, any other type of authentication process may be used. In one embodiment, the authentication can be performed each time the remote operator device accesses the network system. Alternatively, the authentication may be performed when the out of band controller and external management interface are incorporated into the network system platform. Once authenticated, the remote operator uses the remote operator device to access and control the out of band controller (e.g., the controller 130 or the controller 305 described herein).

In an operation 410, the network system identifies one or more devices that are to be disabled. In an illustrative embodiment, the one or more devices to be disabled are PCIe devices. Alternatively, any other connected devices may also be disabled, such as SATA devices, etc. The devices to be disabled are identified based on their function and/or based on their current health. For example, all NIC devices and other devices connected to an external network may be disabled based on their function (i.e., communicating with a publicly accessible external network). Similarly, any devices which have been targeted in an attack or which otherwise may have been compromised are also disabled.

In an operation 412, an alert is sent to the CPU from the out of band controller. The alert is used to inform the CPU of the upcoming hot plug event(s) such that the CPU and/or OS are able to complete any in progress routines which utilize the identified devices. The CPU also uses the alert to inform unaffected devices (e.g., a FPGA) to expect changes in traffic, data, etc. that may result from disablement of the identified devices. As discussed above, in one embodiment, the out of band controller can wait for a response from the CPU indicating that the hot plug events can proceed because the routines have concluded. If a threshold time period passes after issuance of the alert and the out of band controller has not received a response from the CPU, the out of band controller is configured to proceed with the disconnection process.

In an operation 415, the one or more identified devices are disabled by removing the normal data and power inputs to the devices. As discussed above, the PCIe card for any PCIe devices can include a PMIC and a buffer such that the out of band controller is able to control inputs to the PCIe device. As also discussed herein, the PMIC(s) and buffer(s) can be included elsewhere in the network system in alternative embodiments. In an illustrative embodiment, the remote operator device instructs the out of band controller to cause the PMIC and buffer to disable the regular 12 V signal, 3V3 signal, and data inputs to the PCIe cards of the identified devices. As a result, it appears to the CPU of the network system that a hot plug event has occurred and that the devices have been removed from the system. Additionally, blocking the data input to the PCIe card ensures that the device is unable to access sensitive or other data stored on the network system.

In an operation 420, auxiliary power is applied to the identified devices. In an illustrative embodiment, the auxiliary power is applied responsive to an instruction to the out of band controller through the external management interface. The instruction can be to use the PMIC to apply a 3V3 signal to the PCIe card by way of an auxiliary rail. Alternatively, the auxiliary power can originate from a different source. The auxiliary power allows the out of band controller to communicate with and control the disabled devices. In an operation 425, remediation is performed on the disabled devices. The remediation, which can include device testing, device firmware updates, other software upgrades, etc., is performed through the out of band controller. In an alternative embodiment in which the devices have been disabled solely because of their function (i.e., the devices have not been compromised), the device remediation process may not be performed.

In one embodiment, remediation of software/firmware running on disabled devices is performed using a microcontroller that is directly connected to one or more storage devices that maintain software/firmware for the disabled devices. The microcontroller can be the out of band controller described herein, or another microcontroller that is incorporated into the network system. In an illustrative embodiment, the microcontroller is paired with the PMIC and is used to test, remediate, and/or update peripheral device software/firmware.

In an operation 430, one or more tests are conducted to assess the health of the hypervisor of the network system, if present. The out of band controller utilizes the CPU of the network system to run a hash or other algorithm to verify the status of the hypervisor. Alternatively, the out of band controller may directly run the hash or other algorithm on the hypervisor 365 independent of the CPU. The out of band controller also generates, or instructs the CPU to generate, an attestation report with respect to the health of the hypervisor. In other embodiments, any other health assessment techniques may be used. In an operation 435, a determination is made regarding whether the hypervisor has been compromised. The determination can be based on an analysis by the out of band controller or the operator device in communication with the out of band controller of the results of the operation 430. For example, the out of band controller (or the operator device) can attempt to verify that the hash is correct and/or that the attestation report is indicative of a healthy hypervisor. The out of band controller can also determine whether the CPU has been compromised by using a sandbox, by running tests, etc.

If it is determined in the operation 435 that the hypervisor has been compromised, the network system spins any in progress customer applications to another system using a TOR switch or another technique. As a result, customers can continue to utilize the network system with little or no interruption in service. A compromised hypervisor can be catastrophic. As a result, one or more components of the network system are rebuilt in an operation 445. The one or more components to be rebuilt can include the hypervisor, the CPU, system software, etc. The network system components can be rebuilt remotely through the external management interface. Alternatively, the components can be rebuilt by an onsite technician.

If it is determined in the operation 435 that the hypervisor has not been compromised, the network system identifies one or more virtual machines to rebuild in an operation 450. In an operation 455, the network system rebuilds the identified one or more virtual machines. In an illustrative embodiment, only virtual machines which have potentially been compromised due to the threat are rebuilt. As a result, any unaffected virtual machines can continue running customer applications such that customers do not experience a service outage. In an alternative embodiment, all of the virtual machines in the network system may be rebuilt. The out of band controller can interact with the hypervisor directly or through the CPU to rebuild the virtual machines.

In an operation 460, the one or more disconnected devices are reconnected to the network system. In an illustrative embodiment, the out of band controller is used to enable the normal power supply signals and data signals to the disabled devices. The auxiliary power applied in the operation 420 is also removed from the previously disabled devices. As a result, the network system is again fully functional and the threat response is complete.

Figure 5:
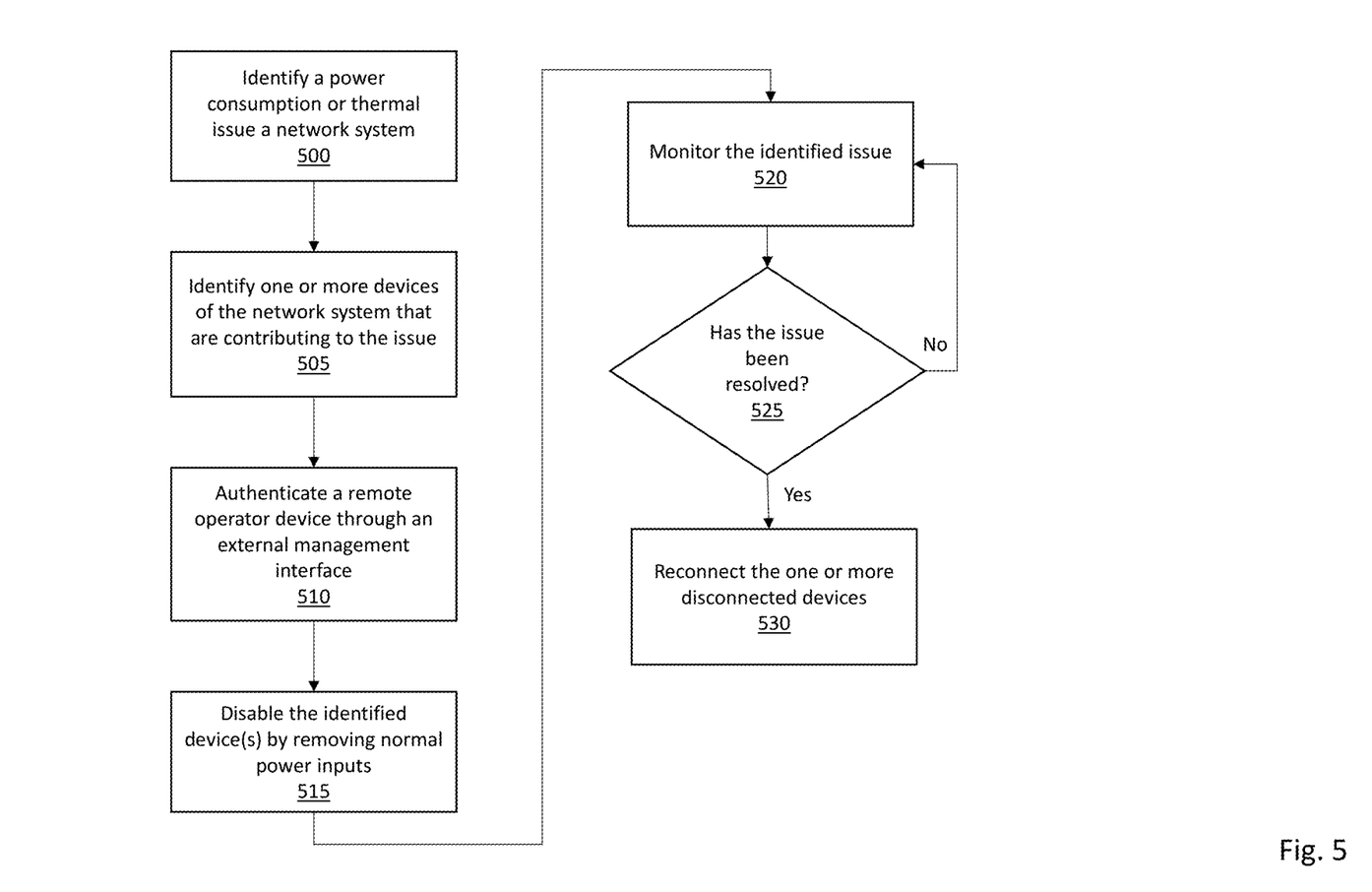
FIG. 5 is a flow diagram depicting operations to improve network system performance in accordance with an illustrative embodiment.

FIG. 5 is a flow diagram depicting operations to improve network system performance in accordance with an illustrative embodiment. In alternative embodiments, fewer, additional, and/or different operations may be performed. Additionally, the use of a flow diagram is not meant to be limiting with respect to the order of operations performed. In an operation 500, the network system identifies a power consumption issue or a thermal issue in the system. The power consumption issue can result from a rack consuming too much power, and can be identified by a power management system. The thermal issue can be a situation in which component/system temperature exceeds an acceptable operating threshold. In certain scenarios, a power consumption issue causes a thermal issue. Alternatively, the thermal issue may be independent of power consumption. The power consumption and/or thermal issue can be identified by local or remote system software, the use of sensors, etc.

In an operation 505, the network system identifies one or more devices that are contributing to the issue. The one or more devices can be devices which consume a lot of power and/or devices which generate a large amount of heat in use. The one or more devices can also include devices which are temporarily expendable without interrupting the basic functionality of the network system. The one or more devices can be PCIe devices, SATA devices, or other device types. Identification of the one or more devices can be done by local or remote system software.

In an operation 510, a remote operator device is authenticated through an external management interface of the network system. The remote operator can be an authorized technician and the remote operator device can be any type of network accessible computing device. The authentication can be a mutual authentication in the form of a key exchange or any other type of authentication process. Once authenticated, the remote operator can use the remote operator device to access and control an out of band controller incorporated into the network system.

In an operation 515, the one or more identified devices are disabled by removing the normal data and power inputs to the devices. As discussed above with respect to PCIe devices, the network system can include a PMIC and a buffer such that the out of band controller is able to control inputs to the PCIe device. In an illustrative embodiment, the remote operator device instructs the out of band controller to disable the regular power inputs of the identified devices using the PMIC. Devices other than PCIe devices can similarly be disabled by removing their normal power supplies using any of the techniques described herein. The out of band controller works in coordination with the CPU of the network system to perform the disconnect(s). As a result of being disabled, the identified devices no longer consume power, which also eliminates heat generated by the devices.

In an operation 520, the network system monitors the identified issue, which can be a power consumption and/or thermal issue. The monitoring is performed by hardware and/or software incorporated into the network system. In an operation 525, a determination is made regarding whether the issue has been resolved. The determination can be made by the out of band controller or the CPU. Alternatively, the determination may be made by the remote operator device. If it is determined in the operation 525 that the issue has not been resolved, the network system continues to monitor the identified issue in the operation 520. If it is determined in the operation 525 that the issue has been resolved, the one or more disconnected devices are reconnected in an operation 530. In an illustrative embodiment, the devices are reconnected by re-establishing the normal power supplies to the devices using the out of band controller and/or the CPU.

EXAMPLES

A network system includes a central processing unit and a peripheral device in electrical communication with the central processing unit. The peripheral device has at least one power input and a data input. The network system also includes an out of band controller in electrical communication with the central processing unit, the peripheral device, and an external management interface. Responsive to an identified threat, the out of band controller is configured to disable the at least one power input and the data input to the peripheral device. The disablement indicates to the central processing unit that a hot plug event has occurred with respect to the peripheral device. The out of band controller is also configured to enable auxiliary power to the peripheral device such that the out of band controller remains in communication with the peripheral device during remediation of the identified threat.

In one embodiment, the peripheral device comprises a peripheral component interconnect express (PCIe) device, and the PCIe device has a PCIe card that includes a power management integrated circuit (PMIC) and a buffer. The out of band controller uses the PMIC to disable the at least one power input to the PCIe device. The out of band controller also uses the buffer to block the data input. The network system also includes a system management bus, where the PMIC and the out of band controller are connected to the system management bus. The peripheral component can be a network interface card (NIC) that is in electrical communication with an external network.

In another embodiment, the out of band controller is configured to transmit an alert to the central processing unit in advance of disablement of the at least one power input such that the central processing unit is able to complete a routine involving the peripheral component. The central processing unit is configured to send a response to the out of band controller in response to the alert, where the response indicates that the disablement can proceed. The out of band controller is configured to proceed with the disablement of the at least power input in response to expiration of a threshold time period following transmission of the alert irrespective of whether the central processing unit sends the response to the out of band controller.

In another embodiment, the illustrative network system includes a hypervisor in electrical communication with the central processing unit, where the out of band controller is configured to determine whether the hypervisor is compromised as a result of the identified threat. The out of band controller is configured to instruct the central processing unit to conduct a test on the hypervisor, where results of the test are used by the out of band controller to determine whether the hypervisor is compromised. The out of band controller instructs the central processing unit to conduct the test by way of a system management bus or by way of a separate communication path between the out of band controller and the central processing unit.

An illustrative method of responding to threats in a network system includes receiving, by an out of band controller, an instruction to disable a peripheral device in response to an identified threat. The instruction to disable the peripheral device can be received by the out of band controller from an operator device through an external management interface. The peripheral device is in electrical communication with a central processing unit, and the peripheral device has at least one power input and a data input. The method also includes disabling, by the out of band controller, the at least one power input and the data input to the peripheral device such that it appears to the central processing unit that a hot plug event has occurred with respect to the peripheral device. The method further includes enabling, by the out of band controller, auxiliary power to the peripheral device such that the out of band controller remains in communication with the peripheral device during remediation of the identified threat.

The peripheral device can be a peripheral component interconnect express (PCIe) device that has a PCIe card that includes a power management integrated circuit (PMIC). Disabling the at least one power input can include sending, by the out of band controller, a power input disablement instruction to the PMIC to disconnect the at least one power input. The PCIe card can also include a buffer, and disabling the data input can include sending, by the out of band controller, a data input disablement instruction to the buffer to disconnect the data input. The illustrative method can further include transmitting, by the out of band controller, an alert to the central processing unit in advance of disablement of the at least one power input such that the central processing unit is able to complete a routine involving the peripheral component.

Additionally, the central processing unit can be in electrical communication with a hypervisor, and the illustrative method can further include determining, by the out of band controller, whether the hypervisor is compromised as a result of the identified threat. Determining whether the hypervisor is compromised can include instructing the central processing unit to conduct a test on the hypervisor, and analyzing a result of the test to determine whether the hypervisor is compromised. The method can further include instructing, by the out of band controller, at least one of the central processing unit and the hypervisor to rebuild one or more compromised virtual machines.

Embodiments disclosed herein can be implemented as hardware, software, firmware, and/or special purpose processing devices. As an example, a non-transitory computer-readable storage medium has instructions stored thereon that, when executed by one or more processors, cause operations described herein to be performed, such as disabling network devices via simulated hot plug events, performing system remediation, etc. The instructions can be encoded using a programming language such as C, C++, Java, JavaScript, Visual Basic, proprietary languages, etc. The instructions are provided in the form of software applications tangibly embodied on storage medium.

The non-transitory computer-readable medium can be any type of medium able to store digital information, such as a hard drive, a server, a flash memory, random access memory (RAM), a combination of memories, etc. In some embodiments, the components described herein can be implemented using hardware such as field-programmable gate arrays (FPGAs), application-specific integrated circuits (ASICs), etc. It should be apparent that any suitable combination of hardware, software, and firmware can be used to implement the described embodiments, and that the described embodiments are not limited to any particular architecture.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A network system comprising:
    a central processing unit;
    a peripheral device in electrical communication with the central processing unit, wherein the peripheral device has at least one power input and a data input; and
    an out of band controller in electrical communication with the central processing unit, the peripheral device, and an external management interface, wherein responsive to an identified threat the out of band controller is configured to:
        disable the at least one power input and the data input to the peripheral device, wherein the disablement indicates to the central processing unit that a hot plug event has occurred with respect to the peripheral device; and
        enable auxiliary power to the peripheral device such that the out of band controller remains in communication with the peripheral device during remediation of the identified threat.

2. The network system of claim 1, wherein the peripheral device comprises a peripheral component interconnect express (PCIe) device, and wherein the PCIe device has a PCIe card that includes a power management integrated circuit (PMIC) and a buffer.

3. The network system of claim 2, wherein the out of band controller uses the PMIC to disable the at least one power input to the PCIe device.

4. The network system of claim 2, wherein the out of band controller uses the buffer to block the data input.

5. The network system of claim 2, further comprising a system management bus, wherein the PMIC and the out of band controller are connected to the system management bus.

6. The network system of claim 1, wherein the peripheral component comprises a network interface card (NIC) that is in electrical communication with an external network.

7. The network system of claim 1, wherein the out of band controller is configured to transmit an alert to the central processing unit in advance of disablement of the at least one power input such that the central processing unit is able to complete a routine involving the peripheral component.

8. The network system of claim 7, wherein the central processing unit is configured to send a response to the out of band controller in response to the alert, wherein the response indicates that the disablement can proceed.

9. The network system of claim 8, wherein the out of band controller is configured to proceed with the disablement of the at least power input in response to expiration of a threshold time period following transmission of the alert irrespective of whether the central processing unit sends the response to the out of band controller.

10. The network system of claim 1, further comprising a hypervisor in electrical communication with the central processing unit, wherein the out of band controller is configured to determine whether the hypervisor is compromised as a result of the identified threat.

11. The network system of claim 10, wherein the out of band controller is configured to instruct the central processing unit to conduct a test on the hypervisor, wherein results of the test are used by the out of band controller to determine whether the hypervisor is compromised.

12. The network system of claim 10, wherein the out of band controller instructs the central processing unit to conduct the test by way of a system management bus or by way of a separate communication path between the out of band controller and the central processing unit.

13. A method of responding to threats in a network system, the method comprising:
receiving, by an out of band controller, an instruction to disable a peripheral device in response to an identified threat, wherein the peripheral device is in electrical communication with a central processing unit, and wherein the peripheral device has at least one power input and a data input;
disabling, by the out of band controller, the at least one power input and the data input to the peripheral device, wherein the disabling indicates to the central processing unit that a hot plug event has occurred with respect to the peripheral device; and
enabling, by the out of band controller, auxiliary power to the peripheral device such that the out of band controller remains in communication with the peripheral device during remediation of the identified threat.

14. The method of claim 13, wherein the peripheral device comprises a peripheral component interconnect express (PCIe) device, wherein the PCIe device has a PCIe card that includes a power management integrated circuit (PMIC), and wherein disabling the at least one power input comprises sending, by the out of band controller, a power input disablement instruction to the PMIC to disconnect the at least one power input.

15. The method of claim 14, wherein the PCIe card includes a buffer, and wherein disabling the data input comprises sending, by the out of band controller, a data input disablement instruction to the buffer to disconnect the data input.

16. The method of claim 13, further comprising transmitting, by the out of band controller, an alert to the central processing unit in advance of disablement of the at least one power input such that the central processing unit is able to complete a routine involving the peripheral component.

17. The method of claim 13, wherein the central processing unit is in electrical communication with a hypervisor, and further comprising determining, by the out of band controller, whether the hypervisor is compromised as a result of the identified threat.

18. The method of claim 17, wherein determining whether the hypervisor is compromised comprises:
instructing the central processing unit to conduct a test on the hypervisor; and
analyzing a result of the test to determine whether the hypervisor is compromised.

19. The method of claim 17, further comprising instructing, by the out of band controller, at least one of the central processing unit and the hypervisor to rebuild one or more compromised virtual machines.

20. The method of claim 13, wherein the instruction to disable the peripheral device is received by the out of band controller from an operator device through an external management interface.

21. A non-transitory computer-readable storage medium having computer-readable instructions stored thereon that, upon execution by one or more processors in a network system, result in operations comprising:
processing an instruction to disable a peripheral device in response to an identified threat, wherein the peripheral device is in electrical communication with a central processing unit, and wherein the peripheral device has at least one power input and a data input;
disabling the at least one power input and the data input to the peripheral device, wherein the disabling indicates to the central processing unit that a hot plug event has occurred with respect to the peripheral device; and
enabling auxiliary power to the peripheral device such that the out of band controller remains in communication with the peripheral device during remediation of the identified threat.

22. The non-transitory computer-readable storage medium of claim 21, wherein disabling the at least one power input comprises sending a power input disablement instruction to a power management integrated circuit (PMIC) to disconnect the at least one power input.

23. The non-transitory computer-readable storage medium of claim 21, wherein disabling the data input comprises sending a data input disablement instruction to a buffer associated with the peripheral device.

24. The non-transitory computer-readable storage medium of claim 21, the operations further comprising determining whether a hypervisor of the network system is compromised as a result of the identified threat.

* * * * *